(12) United States Patent
Wade et al.

(10) Patent No.: US 7,090,094 B2
(45) Date of Patent: Aug. 15, 2006

(54) HANDLE FOR COOKWARE

(75) Inventors: Jeffrey Wade, Hong Kong SAR (HK); Ricky Yuen, Hong Kong SAR (HK)

(73) Assignee: Main Power Electrical Factory Ltd., Kowloon (HK)

( * ) Notice: Subject to any disclaimer, the term of this patent is extended or adjusted under 35 U.S.C. 154(b) by 26 days.

(21) Appl. No.: 10/783,633

(22) Filed: Feb. 20, 2004

(65) Prior Publication Data

US 2005/0184079 A1    Aug. 25, 2005

(51) Int. Cl.
*B65D 25/10* (2006.01)
*B65D 53/00* (2006.01)
*B65D 81/24* (2006.01)

(52) U.S. Cl. .................. 220/764; 220/763; 220/756; 220/573.1

(58) Field of Classification Search .............. 81/3.07, 81/3.09, 3.15, 3.25, 3.27, 3.37; 16/422, 425; 220/284, 285, 912, 318, 573.1, 573.3, 574.2, 220/756, 762, 763, 764, 765, 908
See application file for complete search history.

(56) References Cited

U.S. PATENT DOCUMENTS

| | | | | |
|---|---|---|---|---|
| 1,698,929 A * | 1/1929 | Wentorf | | 220/318 |
| 2,572,629 A * | 10/1951 | Kolell | | 292/241 |
| 6,079,590 A * | 6/2000 | Munari | | 220/762 |
| 6,220,477 B1 * | 4/2001 | Schneider | | 220/763 |
| 6,419,107 B1 * | 7/2002 | Cheng | | 220/573.1 |

* cited by examiner

*Primary Examiner*—Nathan J. Newhouse
*Assistant Examiner*—Harry Grosso
(74) *Attorney, Agent, or Firm*—Alix Yale & Ristas, LLP

(57) ABSTRACT

A handle for use with cookware that has a base and a lid defining a cooking chamber. The handle is pivotally mountable to cookware about a horizontal axis and moves between a lifting position and a stored position. The handle has a cam for raising an edge of the lid when the handle is pivoted towards the stored position. A catch can be provided for positioning and holding the handle relative to the cookware. The catch has an elastically resilient member having a detent for engaging a recess positioned with the handle and is released by force applied to the handle.

13 Claims, 4 Drawing Sheets

HANDLE FOR COOKWARE

BACKGROUND OF THE INVENTION

The present invention relates to handles for cookware, and also to cookware with handles. More particularly, the invention relates to a handle for use with cookware which comprises a base with a lid that forms a cooking chamber.

It is well-known to provide insulated handles on cookware so that the cookware can be handled/lifted whilst hot. Handles are attached to the sides of the cookware and project transversely from the cookware. A problem with these handles is that they make the cookware difficult to store as projecting handles take up considerable room in a cupboard or drawer.

One type of cookware comprises a base unit and a lid which fits over the base unit to define a cooking chamber for the food. During cooking of food steam is generated from moisture in the food and/or from cooking liquids in which the food is placed. The cookware is provided with means to selectively allow this steam to be vented. Commonly, the lid of the cookware has one or more openings and a sliding or rotating cover for the openings that can be moved to uncover the openings to varying degrees to allow steam to vent. However, consumers are demanding more stylish cooking utensils and vents in the lid of cookware detract from its appearance.

OBJECTS OF THE INVENTION

It is an object of the present invention to overcome or substantially ameliorate the above disadvantages and/or more generally to provide a handle for cookware and cookware which is easy to store and which allows venting of steam within the cooking chamber without detracting from the appearance of the cookware.

DISCLOSURE OF THE INVENTION

According to a first aspect the invention provides a handle for cookware having a handle for use with cookware, the cookware having a wall and an attachment member, wherein the handle is pivotally mountable to the attachment member about a horizontal axis for movement between a lifting position wherein the handle projects transversely from the cookware and a stored position wherein the handle is approximately parallel to the wall of the cookware.

Preferably the handle further includes a catch for positioning and holding the handle relative to the cookware, and wherein the catch is released by force applied to the handle.

Preferably, the catch includes an elastically resilient member having a detent for engaging a recess positioned with the handle.

According to a second aspect the invention provides a handle for use with cookware having a base and a lid defining a cooking chamber, the base including a wall and an attachment member, wherein the handle is pivotally mountable to the attachment member about a horizontal axis for movement between a lifting position wherein the handle projects transversely from the cookware and a stored position wherein the handle is approximately parallel to the wall of the cookware.

Preferably, the handle includes a cam for raising an edge of the lid when the handle is pivoted in a direction of the stored position.

Preferably, the cam is a curved surface eccentric to the horizontal axis.

Preferably the handle further includes a catch for positioning and holding the handle relative to the cookware, and wherein the catch is released by force applied to the handle.

Preferably, the catch includes an elastically resilient member having a detent for engaging a recess positioned with the handle.

According to a third aspect the invention provides a cookware item comprising:
 a base having a wall and an attachment member,
 a lid locatable on the base for defining a cooking chamber, and
 a handle pivotally mounted to the attachment member about a horizontal axis and movable between a lifting position wherein the handle projects transversely from the cookware and a stored position wherein the handle is approximately parallel to the wall of the cookware.

Preferably, the handle includes a cam for raising an edge of the lid when the handle is pivoted in a direction of the stored position.

Preferably, the cam is a curved surface eccentric to the horizontal axis.

Preferably the handle further includes a catch for positioning and holding the handle relative to the cookware, and wherein the catch is released by force applied to the handle.

Preferably, the catch includes an elastically resilient member having a detent for engaging a recess positioned with the handle.

Further aspects of the invention will become apparent from the following description which is given by way of example only.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
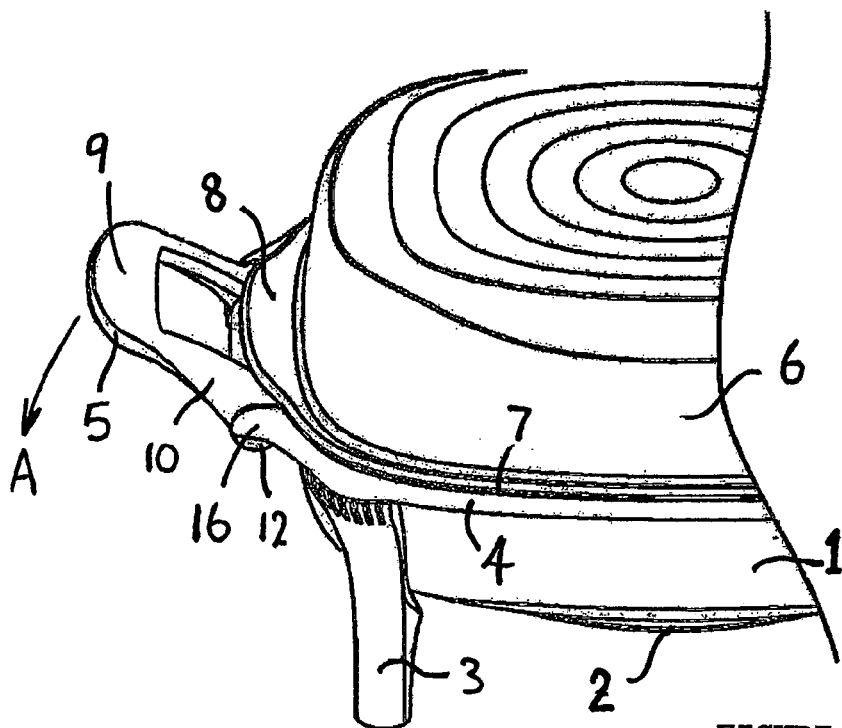
FIG. 1 is a partial perspective view of a handle and cookware according to the invention.

In the accompanying drawings there is depicted cookware with a pivoting handle. The cookware comprises a base unit 1 with an integral heating element in a bottom 2 thereof. The base unit 1 is provided with four evenly spaced legs 3 for supporting it on a flat surface. At the top edge of a wall of the base unit 1 is a flange 4 which supports a handle 5 at each end of the base unit 1.

The cookware also includes a lid unit 6 which has a flange 7 around the bottom edge of its wall. The lid unit 6 fits over the base unit 1 so that flange 7 and flange 4 engage forming a cooking chamber within the cookware. At either end of the lid unit 6, corresponding to the location of handles 5 on base unit 1, flange 7 extends into a projecting tab 8.

Handles 5 are made from non heat-conducting material such as thermoset plastic. The handles are in the shape of a C having a grip portion 9 and two legs 10 and 11. At the distal ends of each leg 10, 11 is a boss 12, 13. Passing through boss 12, 13 are apertures 14, 15 which define a pivot axis for the handle 5.

Figure 2:
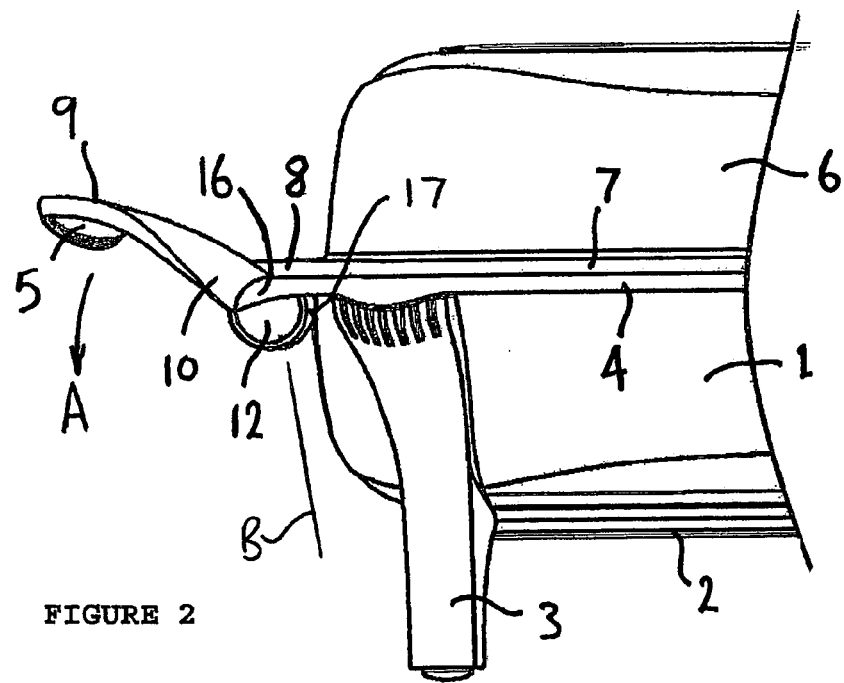
FIG. 2 is a side view of FIG. 1.
Figure 3:
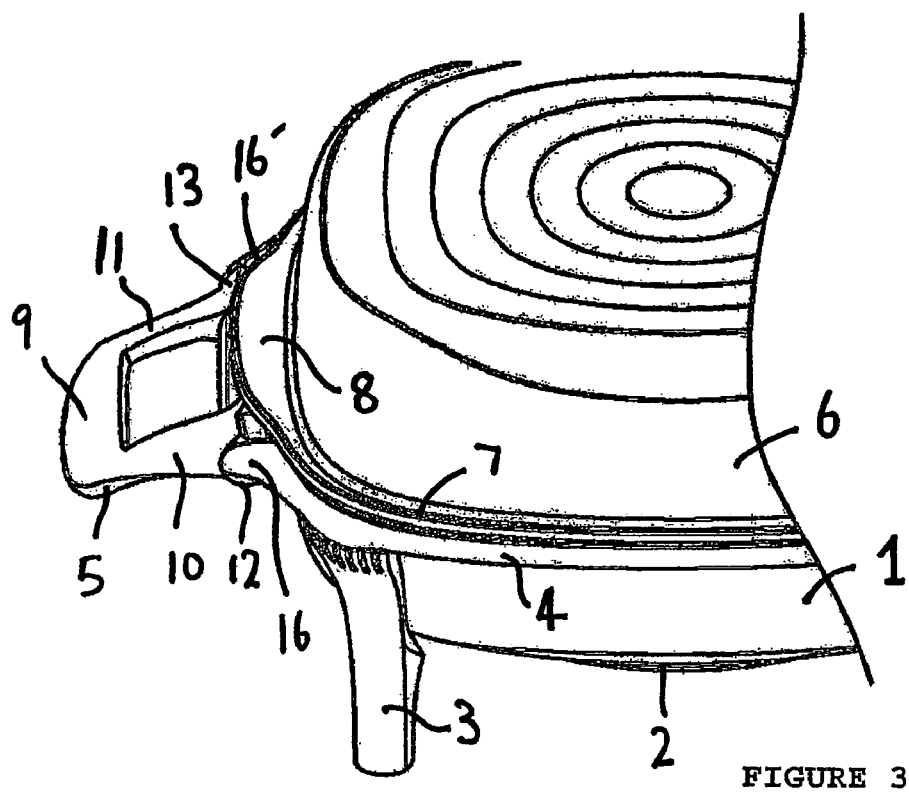
FIG. 3 is a partial perspective view of the cookware with the handle in a venting position.

The handle 5 pivotally connects to a pin between attachment arms 16 of base unit flange 4 so that the pivot axis of the handle 5 is horizontal to the base 1. The handle 5 pivots from an upper lifting position, projecting transversely from the cookware as shown in FIGS. 1 and 3, in the direction of arrow A to a stored position, shown by line B on FIG. 2, in which the handle is approximately parallel to the wall of the base unit 1. In this stored position the handle is out of the way so that the cookware can be stored in a more space efficient manner.

Each boss 12, 13 of handle 5 has a cam 18 comprising a curved ramp surface 18 eccentric to the pivot axis.

Figure 4:
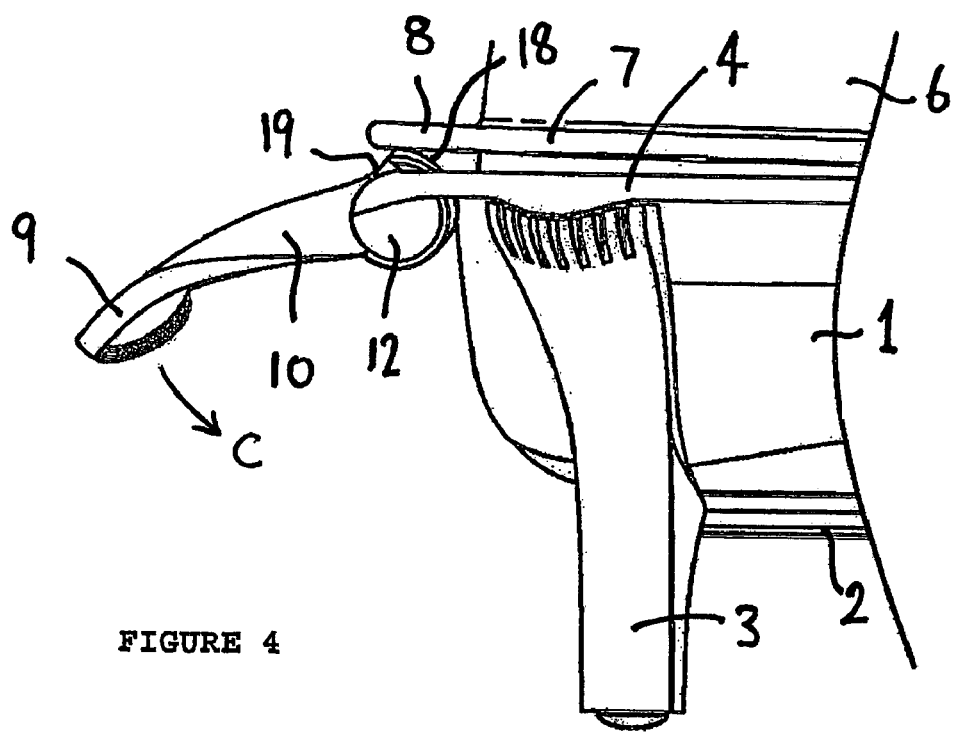
FIG. 4 is a side view of FIG. 3.
Figure 5:
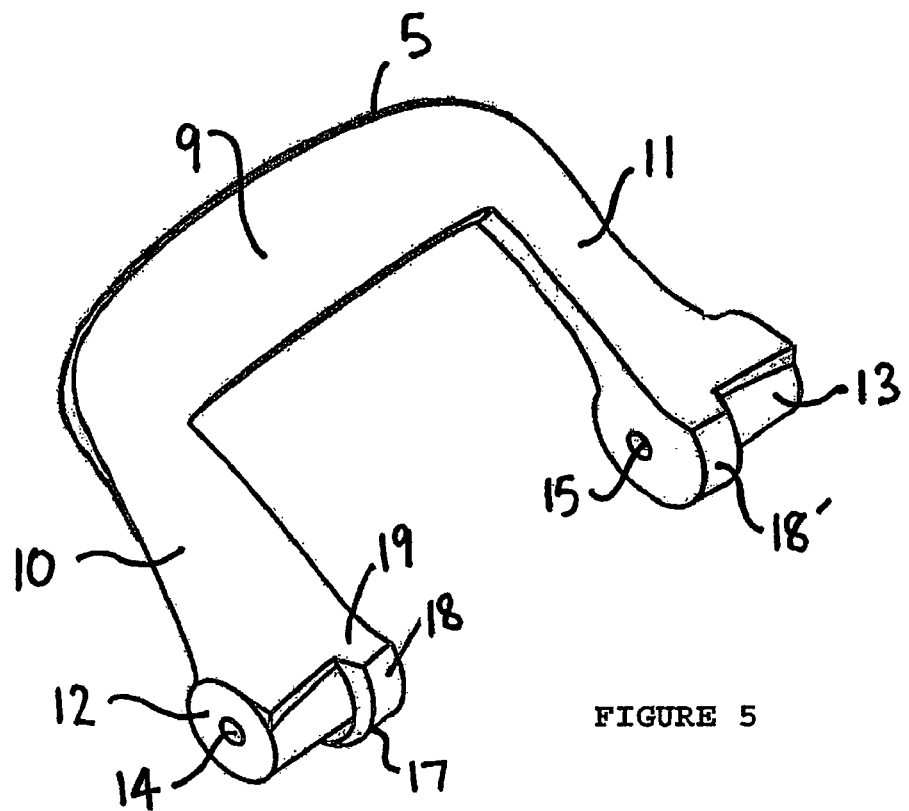
FIG. 5 is a perspective view of the handle.
Figure 6:
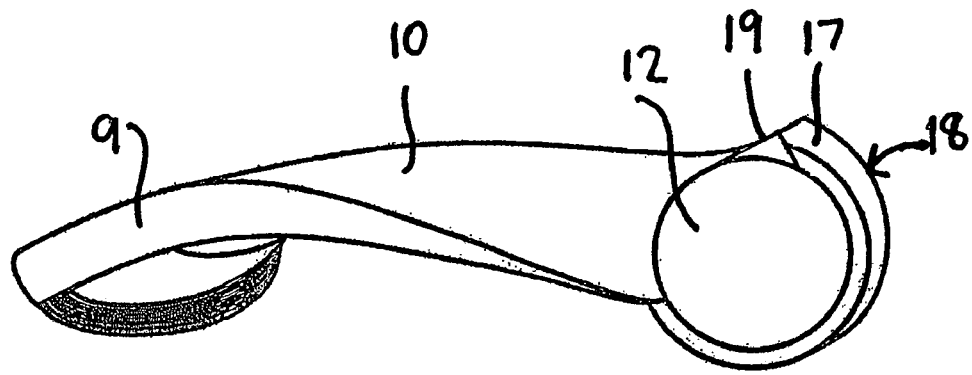
FIG. 6 is a side view of the handle

In the lifting position, shown in FIG. 1, the tab 8 is above the end 19 of cam 17 and sits flat on base unit 1. As handle 2 is pivoted downwards in direction of arrow A to an intermediary position between the lifting and stored positions, as shown in FIGS. 3 and 4, cam 17 engages tab 8 and lifts the edge of lid unit 6 providing a gap between lid unit 6 and base unit 1 for venting steam from within the cooking chamber. As handle 5 is moved further in the direction of stored position B, as indicated by arrow C in FIG. 4, tab 8 follows the eccentric ramp surface 18 so that the distance of the gap between the base unit 1 and lid 6 can be varied. The handles with cams allow the lid to be raised for venting eliminating the need for separate venting openings in the lid.

Figure 7:
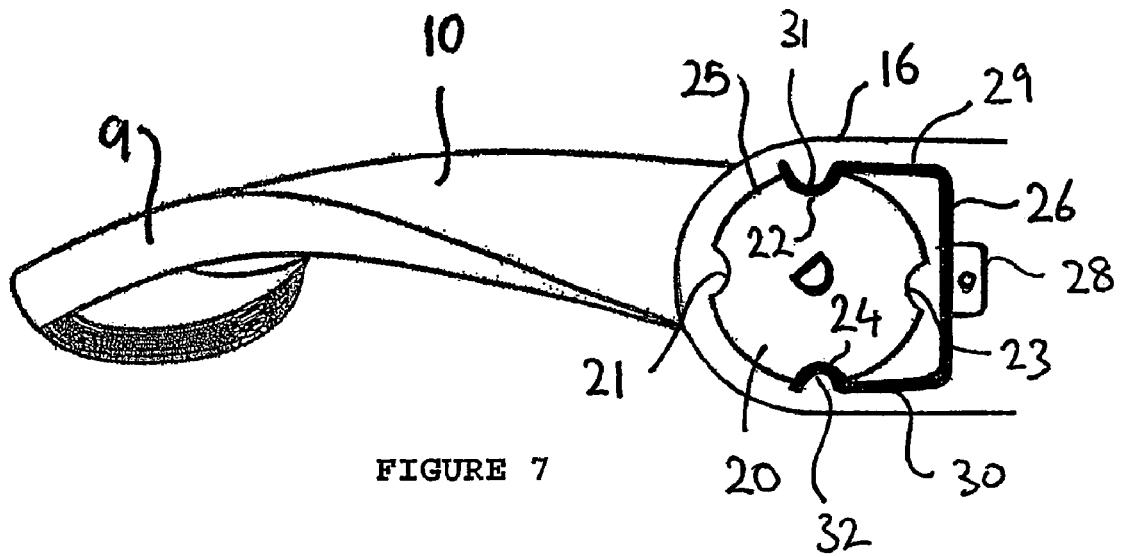
FIG. 7 is a side view a catch for the handle.
Figure 8:
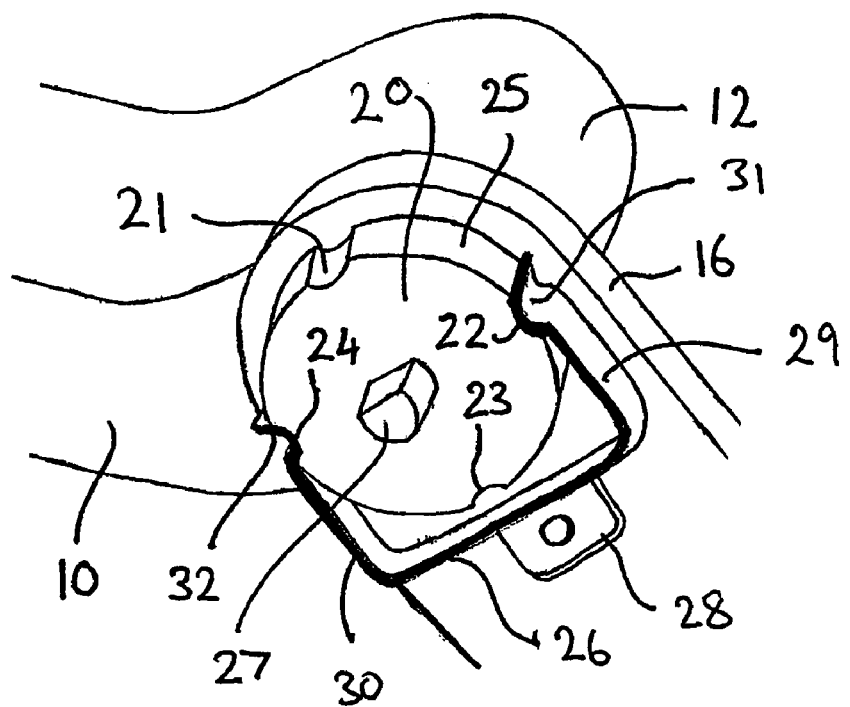
FIG. 8 is a partial perspective view of the catch.

In an alternative embodiment a catch is provided to secure the handle in the stored position, lifting positions, or one or more positions therebetween. The catch comprises a disk 20 and detent spring 26 located on one or both ends of the handle bosses 12, 13. Referring to FIGS. 7 and 8 the disk 20 is mounted coaxially with handle 5 on a key spindle 27 so as to be rotationally fixed with the handle 5. In the illustrated embodiment disk 20 is located on an outside of arm 16 but may be located directly adjacent boss 12 or at any position between the bosses 12, 13 of handle legs 10 and 11.

Disk 20 has four recesses 21, 22, 23, 24 evenly spaced about its periphery 25. Recesses 21 and 23 are diametrically opposed and recesses 22 and 24 are diametrically opposed. Detent spring 26 comprises a flat strip of elastically resilient material formed into a U shape having legs 29 and 30. A flange 28 mounts detent spring 26 adjacent disk 20 on arm 16 such that spring legs 29 and 30 extending to positions either side of disk 20. The distal ends of spring legs 29, 30 are formed into detents 31 and 32 which engage diametrically opposed recesses 22 and 24 of disk 20.

The interaction of detents 31, 32 with recesses 22, 24 provides a catch for positioning and holding the handle 5 in relation to the cookware. The catch is released by force applied to the handle 5. A pair of diametrically opposed recesses is required for each catch position. In the illustrated embodiment there are recesses for two positions, the vent position (FIGS. 4 and 7) and the stored position.

In an alternative embodiment the catch may have two positions, the lifting position and the store position. Such an embodiment would be useful for a griddle, which need not have a lid. The catch would hold the handles conveniently in either the stored position or the lifting position. It is particularly advantageous to have the handles held in the lifting position during use so that the user does not have to fiddle with the handles and moved them to the lifting position while the griddle is hot.

In yet a further embodiment the catch may have three positions: a stored position, a venting position and a lifting position. This would require three pairs of diametrically opposed recesses suitably position about the periphery 25 of disk 20. Such an embodiment would be useful for cookware with a lid.

It should be appreciated that modifications and alterations obvious to those skilled in the art are not to be considered as beyond the scope of the present invention. For example, in the description and claims the term cam is used to describe the mechanical linkage that transforms rotation of the handle into lifting of the lid 1. The preferred embodiment is an eccentric ramp. In an alternative embodiment the cam may be linked levers or the like.

The invention claimed is:

1. A handle for use with cookware, the cookware having a wall and an attachment member, wherein the handle is pivotally mountable to the attachment member about a horizontal axis for movement between a lifting position wherein the handle projects transversely from the cookware and a stored position wherein the handle is approximately parallel to the wall of the cookware; and a catch for positioning and holding the handle relative to the cookware, the catch including an elastically resilient member having a detent for engaging a recess positioned with the handle wherein the handle includes a cam for raising an edge of a lid when the handle is pivoted in a direction of the stored position.

2. The handle of claim 1 wherein the catch is released by force applied to the handle.

3. A handle for use with cookware having a base and a lid defining a cooking chamber, the base including a wall and an attachment member, wherein The handle is pivotally mountable to the attachment member about a horizontal axis for movement between a lifting position wherein the handle projects transversely from the cookware and a stored position wherein the handle is approximately parallel to the wall of the cookware and a catch for positioning and holding the handle relative to the cookware, the catch including an elastically resilient member having a detent for engaging a recess positioned with the handle wherein the handle includes a cam for raising an edge of the lid when the handle is pivoted in a direction of the stored position.

4. The handle of claim 3 wherein the cam is a curved surface eccentric to the horizontal axis.

5. The handle of claim 3 wherein the catch is released by force applied to the handle.

6. A cookware item comprising:
a base having a wall and an attachment member,
a lid locatable on the base for defining a cooking chamber, and
a handle pivotally mounted to the attachment member about a horizontal axis and movable between a lifting position wherein the handle projects transversely from the cookware and a stored position wherein the handle is approximately parallel to the wall of the cookware, and
a catch for positioning and holding the handle relative to the cookware, the catch including an elastically resilient member having a detent for engaging a recess positioned with the handle and wherein the handle includes a cam for raisin an edge of the lid when the handle is pivoted in a direction of the stored position.

7. The cookware of claim 6 wherein the cam is a curved surface eccentric to the horizontal axis.

8. The cookware of claim 6 wherein the catch is released by force applied to the handle.

9. A cookware item comprising: a base and a lid defining a cooking chamber, the base including a wall and an attachment member; a handle pivotally mountable to the attachment member about a horizontal axis for movement; a disc having four recesses evenly spaced about its periphery; and a catch for positioning and holding the handle relative to the cookware in at least two positions, said catch comprising an elastically resilient member having a pair of detents for engaging a pair of diametrically opposed recesses positioned with the handle for each catch position wherein said elastically resilient member is substantially U shaped and has two legs that are formed into detents.

10. The cookware of claim 9 wherein said detents engage said recesses located on the periphery of said disc.

11. The cookware of claim 10 wherein said recesses define positions of said handle relative to the wall of said cookware.

12. The cookware of claim 11 wherein said catch is released by force applied to the handle.

13. The cookware of claim 12 wherein said recesses define three handle positions.

* * * * *

UNITED STATES PATENT AND TRADEMARK OFFICE
CERTIFICATE OF CORRECTION

| | | |
|---|---|---|
| PATENT NO. | : 7,090,094 B2 | Page 1 of 1 |
| APPLICATION NO. | : 10/783633 | |
| DATED | : August 15, 2006 | |
| INVENTOR(S) | : Wade et al. | |

It is certified that error appears in the above-identified patent and that said Letters Patent is hereby corrected as shown below:

Column 4:
Line 28, after "wherein" delete "The" and substitute --the--.

Line 58, delete "raisin" and substitute --raising--.

Signed and Sealed this

Thirteenth Day of March, 2007

JON W. DUDAS
*Director of the United States Patent and Trademark Office*